Sept. 29, 1931.  P. GENY  1,825,518
PROTECTING DEVICE FOR ALTERNATING CURRENT THREE-PHASE MOTORS
Filed Nov. 23, 1928   4 Sheets-Sheet 1

Sept. 29, 1931.    P. GÈNY    1,825,518
PROTECTING DEVICE FOR ALTERNATING CURRENT THREE-PHASE MOTORS
Filed Nov. 23, 1928    4 Sheets-Sheet 4

Inventor:
P. Gèny
By Lanyon, Parry, Card & Lanyon
Attys.

Patented Sept. 29, 1931

1,825,518

UNITED STATES PATENT OFFICE

PAUL GÉNY, OF NANCY, FRANCE

PROTECTING DEVICE FOR ALTERNATING CURRENT THREE-PHASE MOTORS

Application filed November 23, 1928, Serial No. 321,374, and in France December 21, 1927.

It is well known that in polyphase alternating current asynchronous motors with a short circuited rotor (squirrel cage motor and motors with a coil rotor) the intensity of the current is considerable at the moment of starting, the intensity being capable of acquiring (especially when dealing with motors such as squirrel cage motors which are unprovided for starting and which start up under full load) four to five times the value of the intensity which corresponds to the amount at normal operation of the motor.

As regards these motors it has been necessary to utilize circuit breakers of which the fuses are calibrated to a sufficient dimension so that they do not blow when starting the motor. Under these conditions the protection afforded by the circuit breakers becomes necessarily problematical when disturbances occur in the sector, for example when one of the three conductors of the three-phase line is cut out.

In this case in fact there is an elimination of the field normally turning in the motor, this being only supplied by one-phase by means of the two conductors which remain under tension. The operation of such a motor which under certain conditions, may continue to rotate then substantially approaches that of a simple monophase static transformer of which the secondary circuit (in this case the rotor) is short circuited. The demand of current on the phase which has remained under tension becomes excessive and infallibly injures the motor. If on the contrary weaker fuses are used, which however are suitable for normal operation of the motor whilst running, there is a liability that the fuses will blow at each time of starting, especially if the motor, unprovided with starting means, as is the case with squirrel cage motors, starts under load.

The present invention has for its object a device which remedies the defects specified above. This device is provided with fuses calibrated for an intensity of current corresponding with the normal operation of the motor which is thus efficiently protected, these fuses being shunted automatically when starting the motor.

A number of diagrams of the device forming the subject of the present invention are illustrated by way of example in the accompanying drawings.

Figure 1:
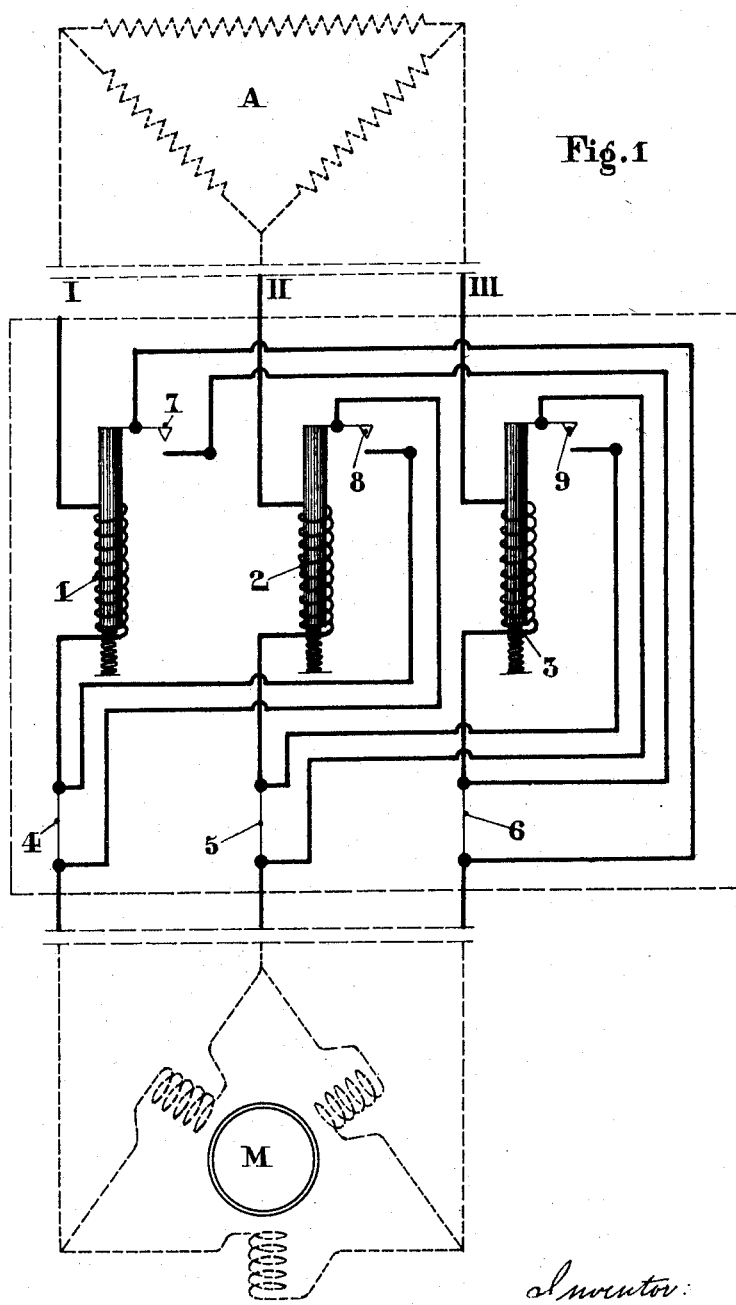
Figure 1 shows a circuit diagram of the device.

In the diagram illustrated in Figure 1, diagram assumed for the case of a squirrel cage three phase motor, arranged in the form of a triangle, I, II, III indicate the three conductors connected to the triphase supply A and to the motor M. In each of the conductors there are included electro-magnets 1, 2 and 3 and fuses 4, 5 and 6 which are calibrated for an intensity corresponding to the normal operation of the motor M.

Each electro-magnet 1, 2 and 3 controls an automatic switch 7, 8 and 9 arranged in shunt with one of the said fuses.

The arrangement is such that each fuse, which is connected directly in circuit with a corresponding terminal of the delta-triangle formed by elements I, II, III, may be shunted by the automatic switch controlled by an electro-magnet included in one of the other leads of the triangle.

In the example illustrated the switch 7, actuated by the electro-magnet 1, is arranged in shunt with the fuse 6; the switch 8, actuated by the electro-magnet 2, is arranged in shunt with the fuse 4; the switch 9 actuated by the electro-magnet 3, is arranged in shunt with the fuse 5.

The operation of these switches may be effected for example by means of a floating core which comes into operation when the current reaches a predetermined intensity.

The electro-magnets 1, 2 and 3 which actuate the switches 7, 8 and 9, are arranged in such a manner that the latter remain open when the current has an intensity corresponding to the consumption of the motor during normal operation and that they are closed when the current reaches an intensity corresponding to that passing through the windings of the motor M when this is started.

The operation of the system is as follows:—

At the moment when current is passed into the motor M, the intensity of the current is four to five time the intensity corresponding to normal operation. The electro-magnets 1, 2 and 3 instantaneously close the switches 7, 8 and 9, which respectively shunt the fuses 6, 4 and 5 which have thus not had time to blow during this demand for a high current.

When the motor M acquires its normal speed (speed corresponding to a predetermined "slip") the intensity of the current reduces to normal and the switches 7, 8 and 9 return to their open position. A normal current, of which the intensity is insufficient to blow the fuses, then passes through the fuses 4, 5 and 6.

If there is an accidental breakage in the conductor connected to the terminal I, there is no longer a normal rotary field in the motor M which, under certain conditions may continue to rotate and then operates, as indicated above, substantially in the manner of a monophase static transformer (viz. between the conductors II and III under voltage) of which the secondary (rotor) is short circuited.

By reason of an intense demand of current (when the motor is under a heavy load) the electro-magnets 2 and 3 close the switches 8 and 9 which shunt the fuses 4 and 5. The switch 7 however, by reason of absence of current in the electro-magnet 1, has not operated and consequently does not shunt the fuse 6. This is melted by the action of the high intensity of the current and the motor is no longer under voltage. When current is re-established in the circuit including terminal I, the high intensity in the electro-magnets 1 and 2 closes the switches 7 and 8. The fuse 6 being shunted by the switch 7, the motor again starts, but as soon as its speed has again reached the normal the three switches 7, 8 and 9 open. At this moment by reason of the interruption which is caused by the position of the melted fuse 6, which interruption destroys the normal rotary field, the motor again operates as a monophase static transformer under voltage, this time by connection with the terminals I and II.

By reason of the high intensity of the current in the circuits including terminals I and II, one of the fuses 4 or 5 will soon fuse and the motor, which is then no longer under voltage, will stop definitely.

Figure 2:
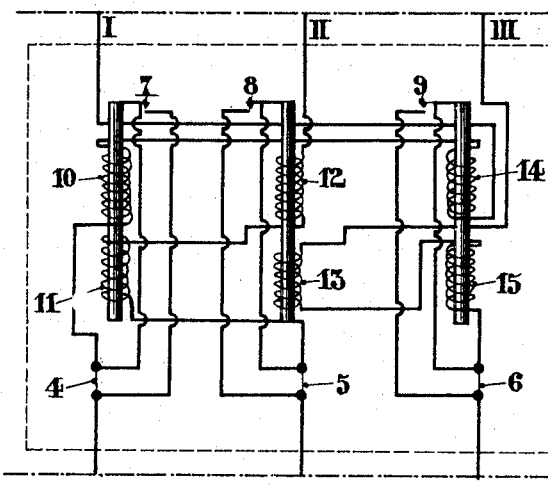
Figures 2, 3, 4 and 5 are modifications of this diagram.

In the modification illustrated in Figure 2 each electro-magnet is provided with two windings each of which is connected to a different phase circuit. Each fuse may be shunted by an automatic switch actuated by an electro-magnet of which one of the two windings is connected to the bar provided with the fuse in question. When switches 7 and 9 open it is also possible that fuse 4 may melt. Each automatic switch is arranged in such a manner that it only closes under the action of a current of abnormal intensity passing through the two windings of the electro-magnet.

In the example illustrated the switch 7, actuated by the electro-magnet having the two windings 10 and 11, is arranged in shunt with the fuse 4. The switch 8, actuated by the electro-magnet provided with the windings 12 and 13, is arranged in shunt with the fuse 5. The switch 9 actuated by the electro-magnet provided with the windings 14 and 15, is arranged in shunt with the fuse 6.

The operation of this system is as follows:

A. If no current passes through the terminal I at the moment of closing the three-pole switch of the motor, the switches 7 and 9 remain open. Only the switch 8 closes and shunts the fuse 5. As the fuse 6 is not shunted it melts instantaneously and the current is cut from the motor. If current is re-established in the wire of the phase connected to the current terminal I, the switches 8 and 9 do not close as a result of which the fuse 5 melts and the motor is definitely stopped.

B. If the motor is in full operation at the moment when the current is interrupted in the circuit including the conductor I, the said motor being under operation and connected to circuits II and III, may under certain conditions continue to rotate at a slow speed. This operation takes place with a consumption of current which is higher than the consumption at normal operation but insufficient to close the switch 8; the switch 9 also remains open. It thus results that at least one of the fuses 5 and 6 will blow and the motor is stopped.

When current is re-established in the conductor connected to the terminal I the apparatus operates in the same manner as in case A.

Figure 3:
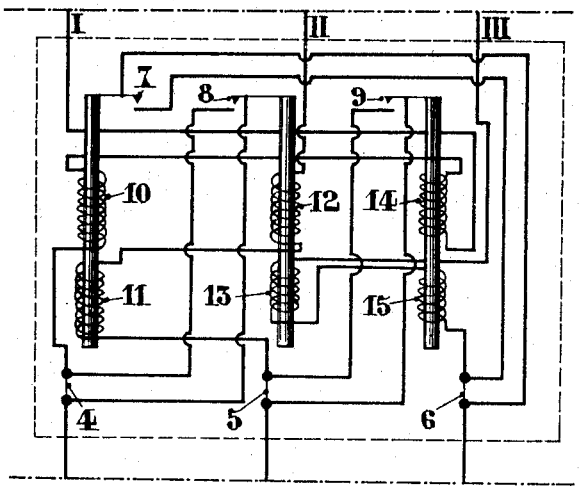

In the modification illustrated in Figure 3 each fuse of a current conducting bar may be shunted by an automatic switch controlled by an electro-magnet provided with two windings respectively included in the other two phase circuits. In Figure 3 the fuse 4 is shunted by the switch 8. The fuse 5 is shunted by the switch 9 and the fuse 6 is shunted by the switch 7.

The operation of this modification is similar to the operation of the device shown diagrammatically in Figure 1.

Figure 4:
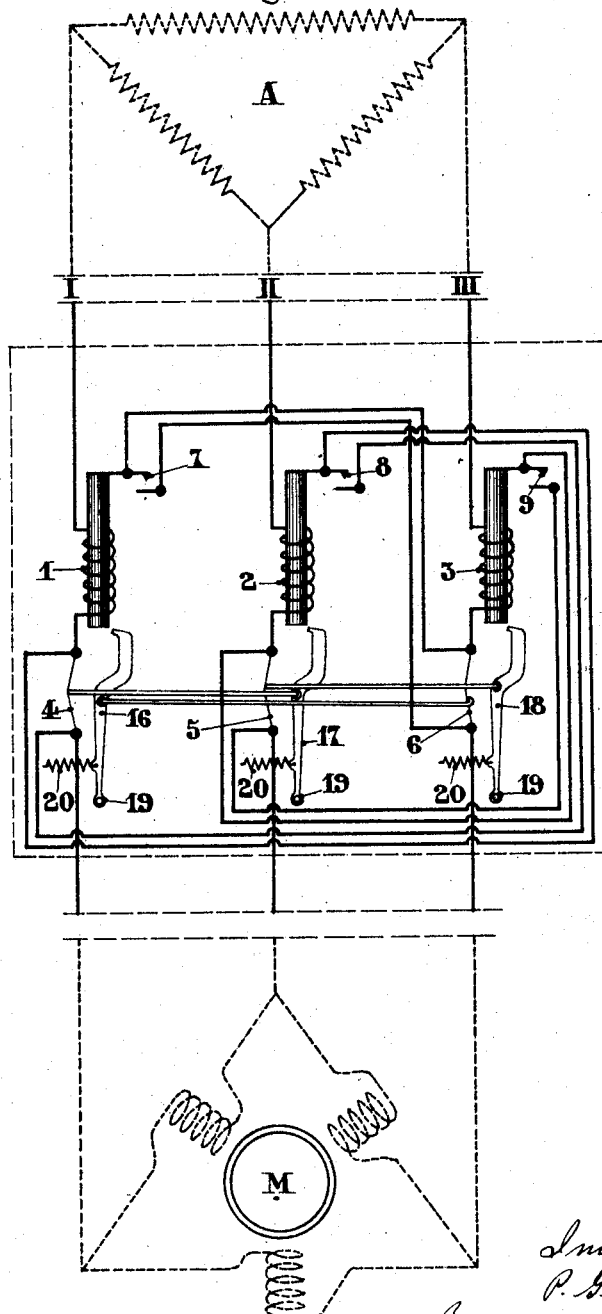
Figure 6:
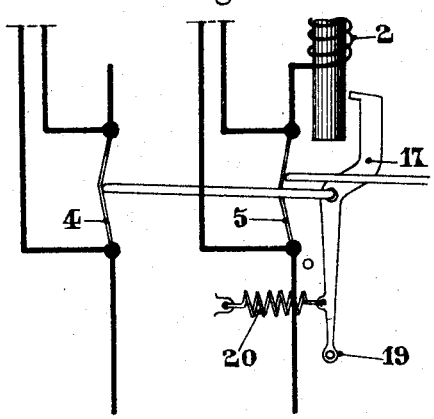
Figures 6 and 7 show details.
Figure 7:
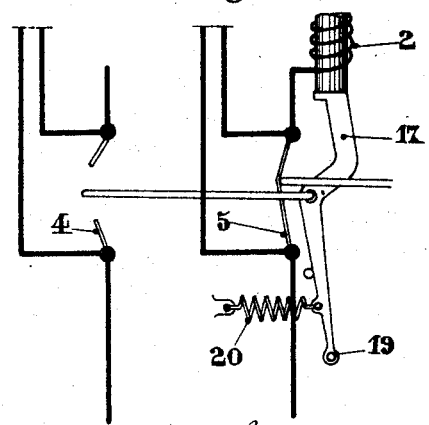

In the modification illustrated in Figure 4 there are added to the protecting device illustrated in Figure 1, three locking members 16, 17 and 18 (in the form of levers pivoted at 19 and subjected to the action of return springs 20) which locking members are adapted to lock the automatic switches 7, 8 and 9 in the open position (see Figure 7) when one of the fuses 4, 5 and 6 which, during normal operation hold the locking members in the disengaged position (see Figure 6) blows.

The operation of the device modified in this manner is as follows:

At the moment current is supplied to the motor M, the intensity due to starting effects the instantaneous closing of the switches 7, 8 and 9 which respectively shunt the fuses 6, 4 and 5. When the motor M has reached its normal speed the intensity of the current passing through the exciting coils 1, 2 and 3 enables the switches 7, 8 and 9 to return to the open position.

If there is an accidental breakage of the live wire connected to the terminal I, the demand of current from the terminals II and III (when the motor is running under a heavy load) effects the closure of the switches 9 and 8 which then shunt the fuses 5 and 4 (through which a current then does not pass) but the switch 7, as no current passes through the electro-magnet 1, is not actuated and consequently does not shunt the fuse 6. This melts under the action of the high intensity and the motor is no longer under voltage. When current is re-established in the terminal I the high intensity in the electro-magnets 1 and 2 causes the switch 8 to close but cannot effect the closure of the switch 7, which, although being acted upon by the core of the winding 1 is locked in the open position by the locking member 18 which is no longer held by the fuse 6 as this has blown. The motor is therefore only under tension from the terminals I and II. As the switch 9 does not operate (by reason of the breakage of the fuse 6 and the locking of the switch 7) the fuse 5, which is not shunted, immediately fuses and as a result of this the motor is definitely isolated.

Figure 5:
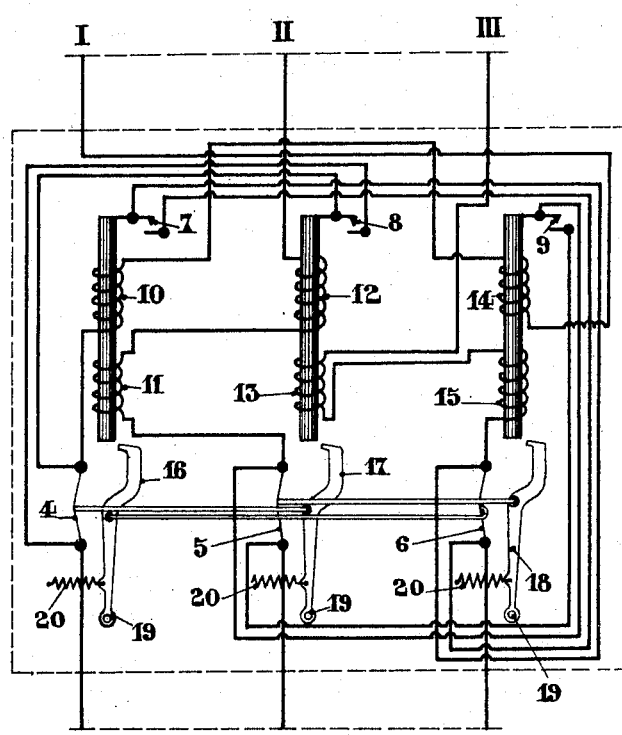

The modification illustrated in Figure 5 illustrates the device shown in Figure 3 to which have been added locking devices similar to those provided in the device shown in Figure 4.

The operation of this latter device is as follows.

If there is no current in the terminal I at the moment when the three-pole switch of the motor is closed the switches 7 and 9 remain open and only the switch 8 closes and shunts the fuse 4 (through which current does not pass at the start). The fuses 5 and 6 are not shunted (as the switches 7 and 9 have not been closed) so that one of these fuses immediately blows so that the motor will no longer be under voltage.

If the current is re-established in the wire of the phase connected to the terminal I, one of the automatic switches 8 and 9 is locked by reason of the coming into action of one of the locking devices 17 or 18. A current of high intensity now passes and one of the two fuses 4 and 5, which has not been shunted, blows so that the motor is definitely stopped.

The device above described and illustrated in various forms of construction and its application to an alternating current three phase motor, of the squirrel cage type, is only given by way of example.

The locking of the automatic switches in the open position may be effected in any suitable manner by means of a device which comes into operation at the moment of the fusion of the fuse which holds it in position.

Such a device may be applied to any polyphase current motor with a short circuit rotor, particularly to motors with a coiled rotor for the purpose of protecting them against stoppages of current in a wire of the polyphase system and against sudden placing under voltage of this wire when the starting rheostat has remained closed and the switch of the stator has also remained closed.

The arrangement and type of the different elements forming part of the device described may be varied without departing from the scope of the invention.

I claim:—

1. A system for protecting alternating current polyphase motors, comprising a motor including a short circuited rotor, current mains connected to said rotor, a multi-wire lead system for said motor, each lead comprising a separate circuit, each of said circuits comprising an electro-magnet, a winding for said electro-magnet, a fuse mounted in series with said winding, and a switch actuated by said electro-magnet to shunt the fuse of a selected one of the other lead circuits.

2. A system for protecting alternating current polyphase motors, comprising a motor including a short circuited rotor; current mains connected to said rotor; a multi-wire lead system for said motor, each lead comprising a separate circuit, each of said circuits comprising an electro-magnet, each electro-magnet having two windings connected, one in each of the other two circuits, and a fuse connected in series with one of the windings; and an automatic switch associated with and cooperating with each of said electro-magnets, each switch being in circuit with one of said fuses, and being adapted to shunt the same, upon actuation by the cooperating electro-magnet.

3. A protective arrangement for polyphase alternating current motors having short-circuited rotor windings, comprising a polyphase distribution net work; feed conductors between said motor and said net work, at least one feed conductor being provided for each phase of the motor output; an electro-magnet associated with each of the said feed conductors; a winding for each of said electro-magnets; a fuse in each of said feed conductors and connected in series with the winding of the corresponding one of said electro-magnets; and an automatic switch in each feed conductor, and actuated by the corresponding electro-magnet, for short-circuiting the fuse of another phase.

4. A protective arrangement for polyphase alternating current motors having short-circuited rotor windings, comprising a polyphase distribution net work; feed conductors connecting each phase of the output of the said motor with the feed distribution net work; an electro-magnet and a fuse in the feed conductor of each phase; each of said electro-magnets having two windings, one of which is connected in a selected one of the two other feed conductors; a fuse for each of said feed conductors, and connected in series, each with one of the windings of the electro-magnet; and an automatic switch in each of the said feed conductors, controlled by the corresponding electro-magnet, for shunting one of the fuses.

5. A protective arrangement for polyphase alternating current motors, having short-circuit rotor windings, comprising a polyphase distribution net work; feed conductors connecting each phase of the output of the said motor with the feed distribution net work; an electro-magnet in each of said feed conductors; two windings for each of said electro-magnets, one of said windings for each electro-magnet being connected in a selected one of the said two other feed conductors; a fuse connected in each of said feed conductors; and an automatic switch in each of said feed conductors, actuated by the corresponding electro-magnet, for shunting the fuse of an adjacent conductor.

6. A protective arrangement for polyphase alternating current motors, having short-circuit rotor windings, comprising a polyphase distribution net work; feed conductors connecting each phase of the output of the said motor with the feed distribution net work; an electro-magnet in each of said feed conductors; two windings for each of said electro-magnets, one of the said windings of each electro-magnet being connected in a selected one of the said two other feed conductors; a fuse connected in each of said feed conductors; an automatic switch also connected in each feed conductor and connected to the corresponding electro-magnet in such manner as to shunt a selected one of said fuses upon actuation by the electro-magnet; and a latch device associated with each of said switches for normally securing the same in its open position.

7. A protective arrangement in accordance with claim 6, characterized by the fact that means are provided, actuated by the corresponding bridging, unbroken fuse, for holding the corresponding latch in its inoperative position.

PAUL GÉNY.